US007312652B2

(12) United States Patent
Brox

(10) Patent No.: US 7,312,652 B2
(45) Date of Patent: Dec. 25, 2007

(54) VOLTAGE REGULATION SYSTEM

(75) Inventor: Martin Brox, München (DE)

(73) Assignee: Infineon Technologies AG, Munich (DE)

( * ) Notice: Subject to any disclaimer, the term of this patent is extended or adjusted under 35 U.S.C. 154(b) by 37 days.

(21) Appl. No.: 11/044,995

(22) Filed: Jan. 28, 2005

(65) Prior Publication Data

US 2005/0168271 A1 Aug. 4, 2005

(30) Foreign Application Priority Data

Jan. 30, 2004 (DE) ...................... 10 2004 004 775

(51) Int. Cl.
*G05F 1/575* (2006.01)
*H02M 3/156* (2006.01)

(52) U.S. Cl. ....................... 327/541; 327/543; 323/266

(58) Field of Classification Search ..................... None
See application file for complete search history.

(56) References Cited

U.S. PATENT DOCUMENTS 5,731,731 A * 3/1998 Wilcox et al. .............. 327/403
6,130,525 A * 10/2000 Jung et al. .................. 323/268
6,130,526 A * 10/2000 Yang et al. ................. 323/272
6,333,623 B1 * 12/2001 Heisley et al. .............. 323/280
6,441,594 B1 * 8/2002 Connell et al. ............. 323/274
6,774,713 B2 * 8/2004 Watanabe ................... 327/540

FOREIGN PATENT DOCUMENTS

| | | |
|---|---|---|
| DE | 69218725 | 5/1993 |
| DE | 69605717 | 12/1996 |
| JP | 08136621 A | 5/1996 |

* cited by examiner

*Primary Examiner*—Kenneth B. Wells
*Assistant Examiner*—Terry Englund
(74) *Attorney, Agent, or Firm*—Slater & Matsil, L.L.P.

(57) ABSTRACT

A voltage regulation process, as well as a voltage regulation system, are discussed. A first voltage present at an input of the voltage regulation system is converted into a second, essentially constant voltage, which can be tapped at an output of the voltage regulation system. The voltage regulation system is provided with an additional device for assessing the efficiency of components connected to the second voltage. If it is determined that the efficiency of the components connected to the second voltage falls below a critical limit indicating the assessed efficiency, the second voltage can be increased.

20 Claims, 3 Drawing Sheets

VOLTAGE REGULATION SYSTEM

CLAIM FOR PRIORITY

This application claims priority to German Application No. 10 2004 004 775.8, filed Jan. 30, 2004, which is incorporated herein, in its entirety, by reference.

TECHNICAL FILED OF THE INVENTION

The invention relates to a voltage regulation system and a voltage regulation process.

BACKGROUND OF THE INVENTION

In semi-conductor components, more particularly memory components such as DRAMs (DRAM=Dynamic Ransom Access Memory and/or dynamic read/write memory) an internal voltage level VINT used inside the component may differ from an external voltage supply (supply voltage level) VDD made available to the semi-conductor component.

In particular the internally used voltage level VINT may be lower than the level VDD of the supply voltage—for instance the internally used voltage level VINT may amount to 1.5 V, and the supply voltage level VDD for instance to between 1.5 V and 2.5 V, etc.

An internal voltage level VINT that is lower than the supply voltage level VDD has the advantage of allowing power dissipation inside the semi-conductor component to be reduced.

In addition, the voltage level VDD of the external voltage supply may be subject to relatively strong fluctuations. Therefore in order for the component to operate in as fault-free a manner and/or as reliably as possible, the supply voltage is generally converted—by means of a voltage regulator—to an internal voltage VINT (which is subject only to relatively minor fluctuations and regulated to a certain constant lower level).

Conventional voltage regulators (for instance corresponding down-converters) may for instance contain a differential amplifier and a p field effect transistor. The gate of the field effect transistor can be connected to an output of the differential amplifier and the source of the field effect transistor for instance to the external voltage supply.

A reference voltage VREF—subject only to relatively minor fluctuations—is applied to the negative input of the differential amplifier. The voltage emitted at the drain of the field effect transistor can then be directly back connected to the positive input of the differential amplifier, or for instance with a voltage splitter interposed.

The differential amplifier regulates the voltage present at the gate connection of the field effect transistor to such an extent that the (back-connected) drain voltage—and therefore the voltage emitted by the voltage regulator—remains constant and at the same time level as the reference voltage, or for instance higher by a particular factor.

In order to generate the above reference voltage VREF, an appropriate conventional reference voltage generating device, for instance a band-gap reference voltage generator can be used, which can—for instance by means of one or more diodes—generate a signal VBGR at a constant voltage level from the supply voltage (exhibiting the above relatively high supply voltage level VDD and occasionally possibly subject to relatively strong voltage fluctuations).

The signal at the constant voltage level VGBR can be fed to a buffer circuit, where it is (temporarily) retained, and then relayed further—in the form of signals at the above reference voltage level VREF—(for instance to the above voltage regulator (and/or the negative input of the corresponding voltage regulator differential amplifier) and/or further devices provided on the semi-conductor component, for instance further voltage regulators)).

The level of the internal voltage VINT emitted by each voltage regulator must be pre-set at such a low level that—taking into account all possible manufacturing faults such as inaccuracies and/or deviations—the semi-conductor component can be reliably operated under all conditions (for instance even with the briefest possible gate length of the transistors, connected to the internal voltage).

With—for instance—longer (actual) gate lengths, etc. the internal voltage VINT selected in the above manner is lower than it could be, which leads to losses in performance.

SUMMARY OF THE INVENTION

The invention is aimed at providing a voltage regulation system, and a novel voltage regulation process.

In one embodiment of the invention, there is a voltage regulation system with which a first voltage (VDD), present at an input of the voltage regulation system, is converted into a second, essentially constant voltage (VINT), which can be tapped at an output of the voltage regulation system where the voltage regulation system is additionally provided with a device for assessing the efficiency of components to be connected to the second voltage (VINT).

In case it is determined—by means of the (additional) device—that the efficiency of the components to be connected to the second voltage (VINT) has fallen below a critical limit (IDSATnom) characterizing the assessed efficiency, the second voltage (VINT) can be increased, thereby improving the efficiency of the components to be connected to the second voltage (VINT).

BRIEF DESCRIPTION OF THE DRAWINGS

The invention is described below in more detail with reference to exemplary embodiments and drawings, in which.

DETAILED DESCRIPTION OF THE INVENTION

Figure 1:
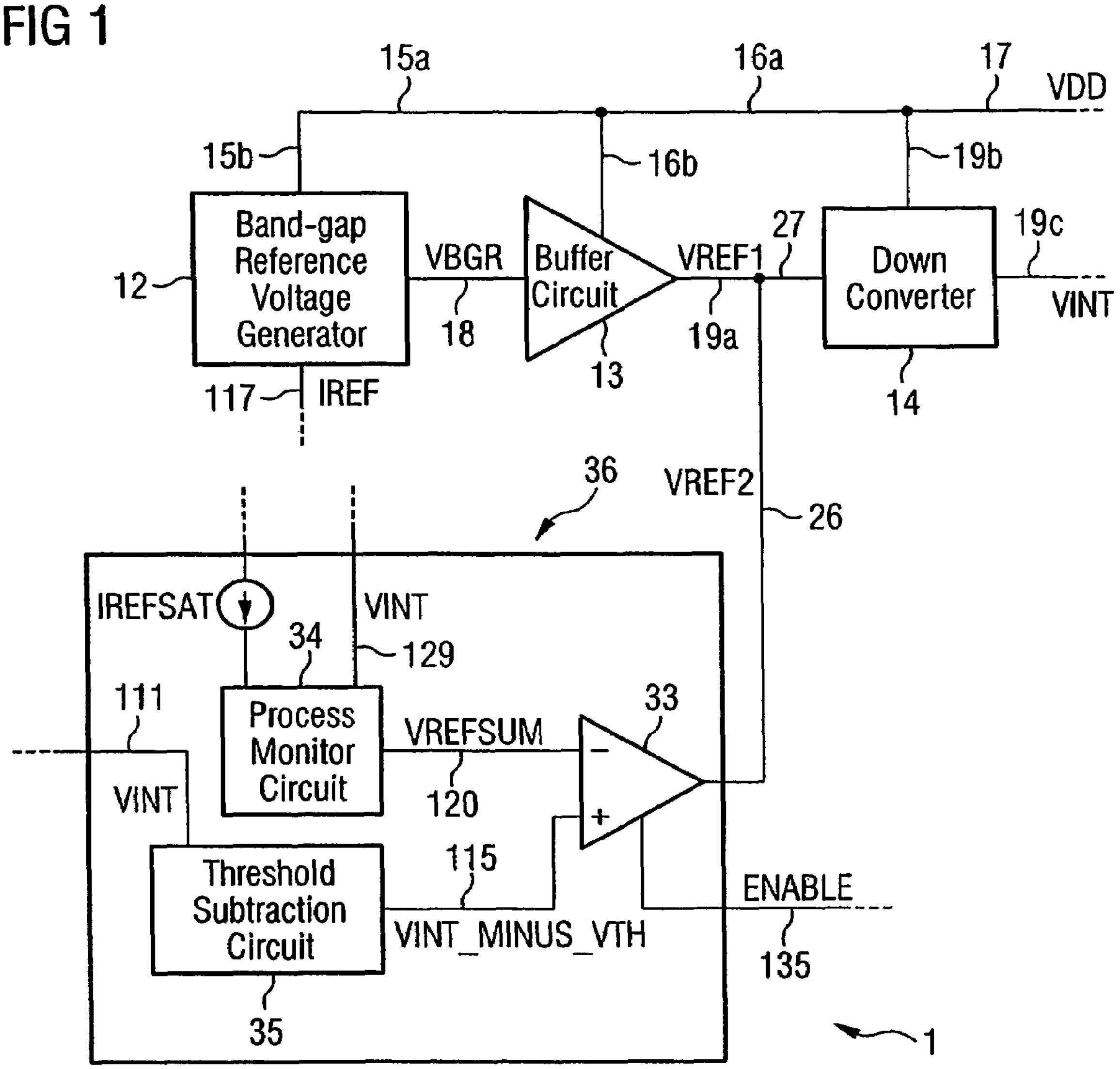
FIG. 1 shows a voltage regulation system according to an embodiment example of the invention.

FIG. 1 shows a schematic representation of a voltage regulation system 1—arranged on a corresponding semi-conductor component—in terms of an embodiment example of the invention.

The semi-conductor component may for instance be a corresponding integrated (analog and/or digital) computer circuit, and/or a semi-conductor memory component such as a function memory component (PLA, PAL, etc.) and/or a table memory component (for instance a ROM or RAM), in particular an SRAM or DRAM.

The voltage regulation system 1 includes a reference voltage generating device 12 (for instance a band-gap reference voltage generator), a buffer circuit 13, and one or more voltage regulators 14 (for instance corresponding down-converters).

As is apparent from FIG. 1, the reference voltage generating device 12 is supplied with an external voltage supply made available to the semi-conductor component—for instance corresponding lines 15*a*, 15*b*, 16*a*, 17 and 19*b*.

The supply voltage is at a relatively high voltage level VDD, which may—on occasion—be subject to relatively strong fluctuations.

The level of the supply voltage may for instance lie between 1.5 V and 2.5 V, for instance approximately between 1.6 V and 2.0 V (1.8 V±0.2 V).

From the supply voltage the reference voltage-generating device 12 generates a signal—for instance by means of one or more diodes—carrying a constant voltage level VBGR.

The signal carrying the constant voltage level VBGR is then relayed via a corresponding line 18 to the above buffer circuit 13 where it is (temporarily) retained, and further distributed—in the shape of a corresponding signal carrying a similarly constant voltage level VREF1—and for instance—via a line 19*a*—to the above voltage regulator 14, (and/or—for instance to a further voltage regulator, etc. for instance via corresponding further facilities provided on the semi-conductor component—not shown here).

The signal—carrying the constant voltage level VBGR—generated by the reference voltage generating device 12—can be additionally used to generate a reference signal carrying a constant current IREF and emitted to a line 117.

Figure 2:
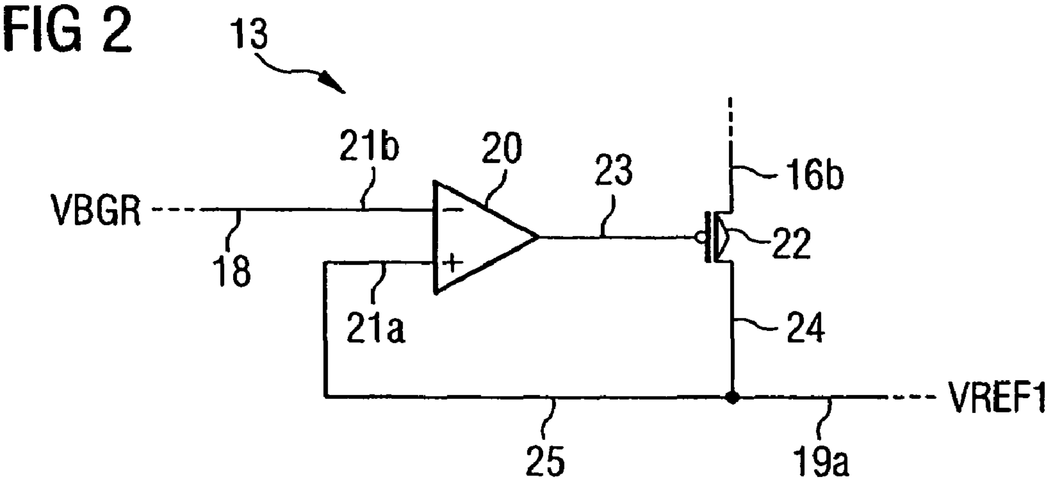
FIG. 2 shows a buffer circuit that can be used in the voltage regulation system represented in FIG. 1.

FIG. 2 shows a schematic detail representation of a buffer circuit 13 to be used in the voltage regulation system 1 shown in FIG. 1.

The buffer circuit 13 includes a differential amplifier 20 with a positive input 21*a* and a negative input 21*b*, and a field effect transistor 22 (here: a p-channel MOSFET).

One output of the differential amplifier 20 is connected to a gate connection of the field effect transistor 22 via a line 23.

As is further shown in FIG. 2, the source of the field effect transistor 22 is connected via a line 16*b* (which—in terms of FIG. 1—is connected to the above lines 16*a*, 17) to the above supply voltage, which is carrying the above relatively high voltage level VDD.

As is apparent from FIG. 2, the above signal carrying the relatively constant voltage level VBGR and relayed via line 18 from the reference voltage generating device 12, is present at the negative input 21*b* of the differential amplifier 20.

The signal emitted at the drain of the field effect transistor 22 and carrying the above relatively constant voltage level VREF1, is back connected via a line 24, and a line 25 connected to it, to the positive input 21*a* of the differential amplifier 20, and—via line 19*a* connected to line 24—further distributed to the above voltage regulator 14 (and/or—for instance via corresponding further lines not shown here—to the above further voltage regulator; etc.).

Figure 3:
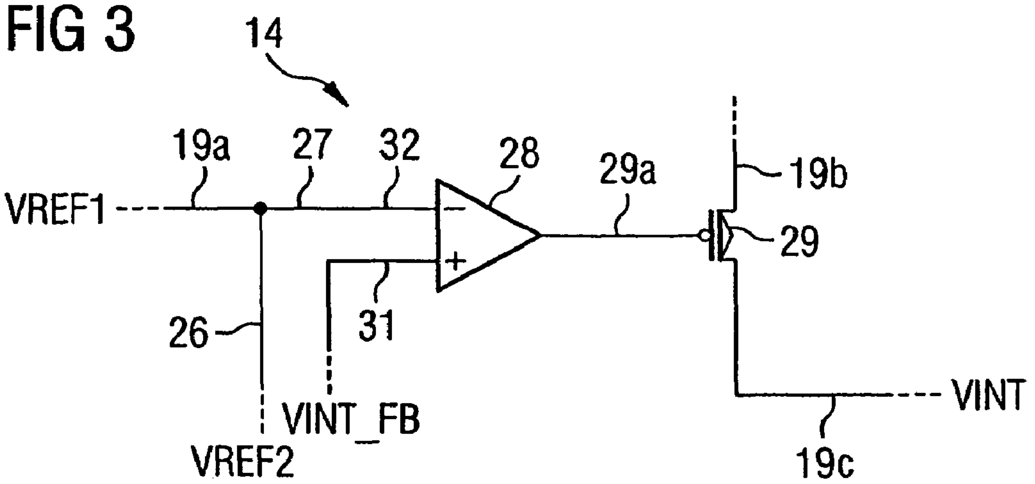
FIG. 3 shows a voltage regulator that can be used in the voltage regulation system represented in FIG. 1.

FIG. 3 shows a schematic detailed representation of a voltage regulator 14 to be used in the voltage regulation system 2 shown in FIG. 1.

The voltage regulator 14 has a differential amplifier 28 with a positive input 32 and a negative input 31, and a field effect transistor 29 (here: a p-channel MOSFET).

One output of the differential amplifier 28 is connected to a gate connection of the field effect transistor 29 via a line 29*a*.

As is further shown in FIG. 3, the source of the field effect transistor 29 is connected—via a line 19*b* ( and—as per FIG. 1—the line 17 connected to it) to the supply voltage, which is at the above relatively high voltage level VDD.

The above (referenced signal—carrying the relatively constant voltage level VREF1 and relayed by the buffer circuit 13 via line 19*a*, and a line 27 connected to it—is available at the negative input 32 of the differential amplifier 28—and so on occasion (as is more closely described below and apparent from FIG. 1) is a (further)(reference) signal, made additionally available by the comparator circuit 33—connected in parallel to the above buffer circuit 13—(which signal—as is more closely described below—carries a voltage level VREF2, and is relayed by the comparator circuit 33 to the voltage regulator 14 via a line 26 and a line 27 connected to it).

In a first embodiment of the voltage regulator 14, the voltage (VINT) emitted at the drain of the field effect transistor 29 is directly back connected to the differential amplifier 28; for this the drain of the field effect transistor 29 can be (directly) connected via a line 19*c* (and another line connected to it but not shown here) to the positive input 31 of the differential amplifier 28 (the back-connected voltage (VINT_FB) present at the positive input 31 of the differential amplifier 28 is then as high as the drain voltage (VINT)).

In a contrasting alternative embodiment, the voltage (VINT) emitted at the drain of the field effect transistor 29 is back connected to the differential amplifier 28 via an interposed voltage splitter (not shown here), i.e. in divided form. For this, the drain of the field effect transistor 29 can be connected via the line 19*c* (and a line connected to it but not shown here) to a first resistance $R_2$ (not shown here) of the voltage splitter, which is on the one hand connected to the earth potential (via a further voltage splitter resistance $R_1$ (also not shown here)), and on the other to the positive input 31 of the differential amplifier 28: the back-connected voltage (VINT_FB) present at the positive input 31 of the differential amplifier 28 will then be lower than the drain voltage (VINT)) by a given factor.

The differential amplifier 28 regulates the voltage present at the gate connection of the field effect transistor 29 in the above first embodiment of the voltage regulator 14 (which is directly back connected to the drain voltage (VINT)) in such a way that the (back-connected) drain voltage (VINT) is just as high as the reference voltage present at the positive input 32 of the differential amplifier 28 (i.e. VREF1 (where VREF1 is higher than VREF2), and/or VREF2 (where VREF2 is higher than VREF1) (see below)).

In the above second, alternative embodiment of the voltage regulator 14—in which the drain voltage (VINT) is not directly back connected, but rather via the above voltage splitter—the voltage present at the gate connection of the field effect transistor 29 is regulated in such a way that the following applies:

$$VINT=VREF\times(1+(R_2/R_1)$$

(or more accurately, as is more closely described below: VINT=VREF1×(1+($R_2$/$R_1$)), where VREF1>VREF2, and/or VINT=VREF2×(1+($R_2$/$R_1$)), where VREF2>VREF1)

The voltage (VINT) emitted at the drain of the field effect transistor 29 (i.e. by the voltage regulator 14) to line 19*c*, represents the output voltage of the voltage regulation system 1 (with which for instance numerous devices provided on the semi-conductor chip, in particular circuitry such as transistors, etc. can be supplied with voltage).

Figure 4:
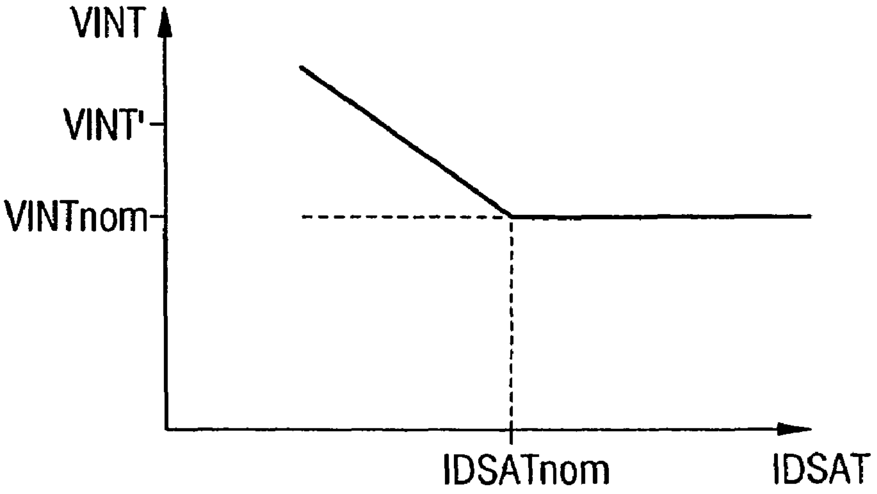
FIG. 4 shows the level of the output voltage of the voltage regulation system shown in FIG. 1, in relation to the level of the saturation current (in both an activated and a non-activated state of the comparator circuit).

The above regulation helps to ensure that the output voltage (VINT) of the voltage regulation system 1—as illustrated in FIG. 4—in contrast to the supply voltage (VDD)—which can be subject to relatively strong fluctuations—carries a constant value VINTnom, for instance 1.5 V, pre-set for example by means of appropriate fuses during a corresponding wafer test, in particular a wafer trimming process (but only when—as is more closely described above—the above component circuit 33) has not been activated, or—in the event that the corresponding transistors—and/or more accurately: through corresponding transistors used as reference transistors—which are connected to the internal voltage VINT—is actually stronger than, or at least as strong as the actually foreseen nominal saturation current (IDSATnom), and/or a corresponding nominal value (as is also more closely described below)).

In conventional voltage regulation systems the level of the internal voltage VINT emitted by each voltage regulator must be pre-set at a sufficiently a low level (for instance at the above value VINTnom), so that—taking into consideration any possible manufacturing inaccuracies and/or deviations—the semi-conductor component is able to be reliably operated under all circumstances (for instance even with the shortest possible gate length of the transistors connected to the internal voltage VINT).

Therefore in conventional voltage regulation systems—with longer (actual) gate lengths for instance (and thereby also accompanying lower saturation currents, etc.)—the internal voltage VINT selected in the above manner may be lower than it might otherwise have seen, which leads to performance losses.

With the voltage regulation system shown in FIG. 1 on the other hand, when the efficiency of the components—transistors in particular—connected to the internal voltage VINT is lower than it might be (for instance as a result of correspondingly longer gate lengths, a corresponding higher critical limit voltage, etc.—and a consequently lower saturation current IDSAT (and/or a low nominal value IDSAT indicating this)—) at an internal voltage VINT of (say) the above level VINTnom, the voltage regulation system 1 generates an internal voltage VINT, which is correspondingly higher than the—actually foreseen—level VINTnom of the internal voltage.

In the present embodiment example it is determined by the above voltage increase detection circuit 36—including the above comparator circuit 33, a manufacturer's process monitor circuit 34, and a critical limit subtraction circuit 35—whether the efficiency of the transistors connected to the internal voltage VINT is lower than it might be at an internal voltage VINT of (say) the above level VINTnom (for instance due to correspondingly longer gate lengths, correspondingly high critical limit voltages, etc.—and therefore lower accompanying saturation currents IDSAT (in particular lower than a saturation current (IDSAT) which is lower than the nominal saturation current (IDSATnom)—)) (and therefore whether the internal voltage VINT—actually used—should be increased (for instance from VINTnom to VINT', cf. FIG. 4)).

If—as is more closely described above—the voltage increase detection circuit 36 determines that the efficiency of the transistors connected to the internal voltage VINT is lower than it might be (for instance due to corresponding long gate lengths, etc.) at an internal voltage VINT of (say) above levels VINTnom, a signal VREF2, at a higher voltage level than that of the signal VREF1 emitted by the buffer circuit 13 to line 19*a*, is emitted by the above comparator circuit 33 of the voltage increase detection circuit 36 to the above line 26.

The level of the voltage VINT emitted by the voltage regulator 14 is then—as already indicated above—correspondingly increased (and in fact for instance—as also already indicated above—for instance from VINT=VINTnom=VREF1 to VINT=VREF2 (and/or from VINT=VIONTnom=VREF1×(1+($R_2$/$R_1$) to VINT=VREF2×(1+($R_2$/$R_1$)).

Thereby the efficiency of the transistors connected to the internal voltage VINT is correspondingly increased—while still ensuring the further reliable operation of the semi-conductor components.

In order to assess the efficiency of the transistors connected to the internal voltage VINT (and thereby to answer the question of whether the voltage VINT should be increased) a nominal figure and/or nominal value (IDSAT) is used in the present embodiment example, which value is generated from the sum of the (simple) total of the saturation currents of a corresponding n-channel field effect (reference) transistor (IDSAT(n)), and double the total of the saturation currents of a corresponding p-channel field effect (reference) transistor (IDSAT(p)); i.e. a nominal saturation current value IDSAT, which is determined as follows:

$$IDSAT=IDSAT(n)+2\times IDSAT(p)$$

(Cf. also the process monitor current 34 as described in more detail below).

This factor "2" for the p-channel field effect transistor arises from the fact that the saturation current driven by the p-channel field effect transistor is (at most) half as high as the saturation current driven by the n-channel field effect transistor.

Figure 5:
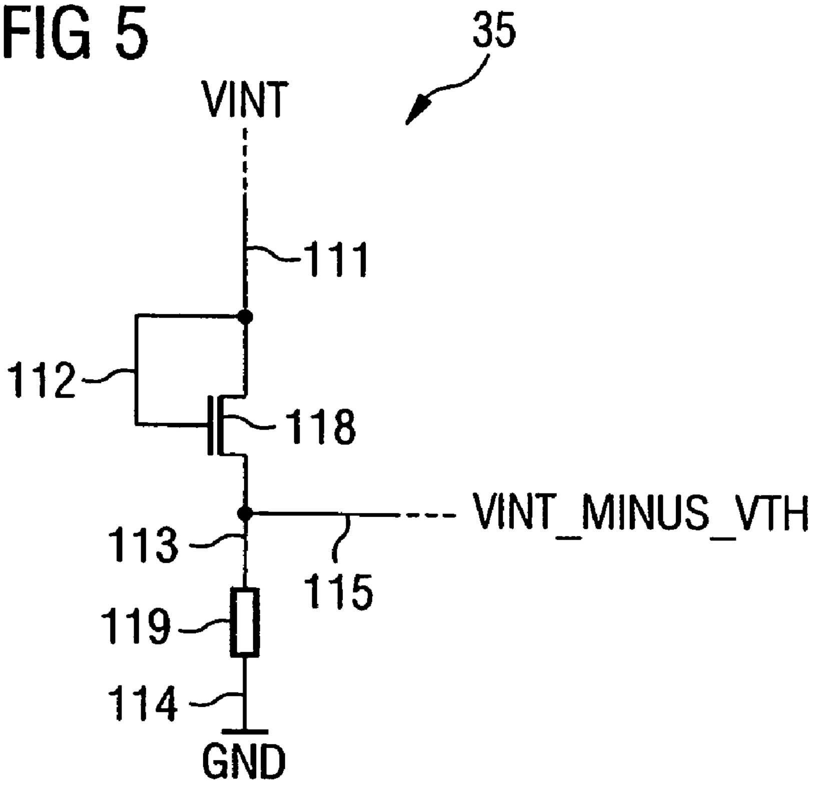
FIG. 5 shows a critical-limit subtraction circuit that can be used in the voltage regulation system represented in FIG. 1.

In FIG. 5 a schematic detailed representation of the above critical limit subtraction circuit 35 is shown.

It contains an n-channel field effect transistor 118, as well as a high-impedance resistance 119 (or alternatively for instance a transistor in a corresponding high-impedance condition).

As is apparent from FIG. 5, the drain of the n-channel field effect transistor 118 is connected—via a line 111—to the above internal voltage VINT (provided by the voltage regulator 14).

The gate of the n-channel field effect transistor 118 is connected—via a line 112—to the line 111, i.e.—in similar fashion—to the above internal voltage VINT (and to the drain of the field effect transistor 118).

The source of the n-channel field effect transistor 118 is connected—via a line 113—to the high-impedance resistance 119, which is earthed—via a line 114—to (ground) potential.

In addition the source of the n-channel effect transistor 118 is connected—via a line 115—(and as is also apparent from FIG. 1) to the positive input of the comparator circuit 33.

In the critical limit subtraction circuit 35, with the help of the field effect transistor 118 and of the high-impedance resistance 119, the level of the signal VINT_MINUS_VTH emitted at the source of the field effect transistor 118—and relayed via the line 115 to the positive input of the comparator circuit 33—is kept at a level that lies below that of the above internal voltage VINT by approximately the critical limit voltage VTH of the field effect transistor 118.

Figure 6:
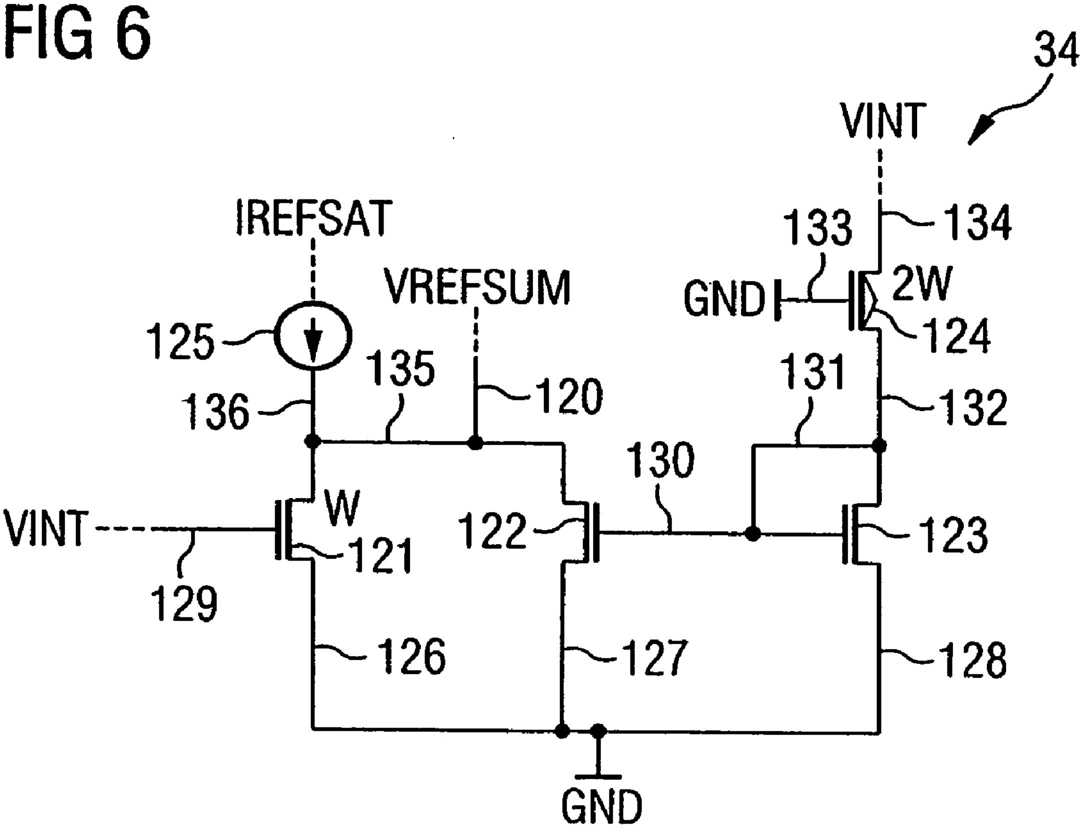
FIG. 6 shows a detailed representation of a process monitoring circuit that can be used in the voltage regulation system represented in FIG. 1.

FIG. 6 shows a schematic detailed representation of the process monitor circuit 34 used in the voltage regulation system 1 shown in FIG. 1.

It contains three n-channel field effect transistors 121, 122, 123, and a p-channel field effect transistor 124 (with which the actual physical characteristics of the circuitry connected to the internal voltage VINT—in particular transistors—is to be simulated (by representation)), as well as a constant current source 125.

With the help of the constant current source 125, a constant current of the value IREFSAT is generated—for instance from the constant current of the value IREF created by the reference voltage generating device 12 and emitted to line 117—to be of the same value as that of the above (ideally provided) nominal saturation current (IDSATnom)—actually foreseen for the transistors provided on the semi-conductor component As is apparent from FIG. 6, the sources of the first, second and third n-channel field effect transistors 121, 122, 123—are grounded—via corresponding lines 126, 127, 128—to earth potential.

The gate of the first n-channel field effect transistor 121 is connected—via a line 129—to the above internal voltage VINT (provided by the voltage regulator 14).

The gates of the second and third n-channel field effect transistors 122, 123 are connected to each other via a line 130 and—via a line 131 connected to it—to the drain of the third n-channel field effect transistor 123.

As is further apparent from FIG. 6, the drain of the p-channel field effect transistor 124 is connected via a line 132 to the drain of the third n-channel field effect transistor 123, and via the lines 131, 130 to the gates of the second and third n-channel field effect transistors 122, 123 via a line 132.

In addition, the gate of the p channel field effect transistor 124 is grounded (to earth potential) via a line 133.

The source of the p channel field effect transistor 124 is connected—via a line 134—to the above internal voltage VINT (provided by the voltage regulator 14).

The drains of the first and second n-channel field effect transistors 121, 122 are connected to one another via a line 135, as well as—via a line 136—to the above constant current source 125A—which drives the above constant current of the value IREFSAT through the n-channel field effect transistors 121, 122.

In addition (and as is apparent from FIG. 1), the drains of the first and second n-channel field effect transistors 121, 122 are connected—via the above line 135, and a line 120 connected to it—to the negative input of the comparator circuit 33 (so that a signal VREFSUM emitted to the drains of the first and second n-channel field effect transistors 121, 122 is relayed to the negative input of the comparator circuit 33).

As is apparent from FIG. 1, the above comparator circuit 33 (and thereby the entire voltage increase detection circuit 36 carrying—in addition to the comparator circuit 33—the above process monitoring circuit 34, and the critical limit subtraction circuit 35) can be activated and deactivated by means of a corresponding signal (ENABLE signal) relayed via a line 135 of the comparator circuit 33.

Advantageously the comparator circuit 33 (and thereby the entire voltage increase detection circuit 36) is at first left in a deactivated state—at least during the above test process, in particular the above wafer trimming process—and activated only later—in particular for instance during the actual operation of the semi-conductor components.

The n-channel field effect transistor 121, and the p channel field effect transistor 124 (both being used as "reference transistors") each always displays a gate length corresponding to a normal gate length—which length is also incorporated in the remaining transistors of the semi-conductor components—(whereby—as illustrated above—the actual gate length of the transistors 121, 124 (and correspondingly also of the remaining transistors) may rise above or fall below the nominal gate length value, due to manufacturing inaccuracies and/or deviations).

The width W of the n-channel field effect transistor 121 has been selected (corresponding to the above formula for the nominal saturation current value IDSAT (IDSAT=IDSAT(n)+2×IDSAT(p)) to be half the size of the width 2W of the p-channel field effect transistor 124.

Due to the signal emitted by comparator circuit 33—as per FIG. 1—carrying the above voltage level VREF2, the voltage regulator 14 is adjusted in such a way that it makes available an internal voltage VINT, which is high enough to ensure that the (reference) transistors—shown in FIG. 6—(i.e. the n-channel field effect transistor 121 and the p-channel field effect transistor 124, and thereby also the other transistors provided on the semiconductor component) are operated in the saturation range.

By ensuring that the corresponding transistors can be operated in the saturation range, performance clearly exceeding that of state of the art components can be achieved—in particular when the gate lengths and/or critical limit voltages of the corresponding transistors fall below the (actually foreseen) nominal value.

As is apparent from FIG. 6, the above saturation current IDSAT(n) flows through the n-channel field effect transistor 121 (and thereby via line 126, connected to the earth potential), as long as the level of the voltage VREFSUM present at the drain of the n-channel field effect transistor 121 a higher than the level of the internal voltage VINT, minus the critical limit voltage VTH—i.e., higher than VINT-VTH (which is determined by the above critical limit subtraction circuit 35, and the comparator circuit 33, and which is correspondingly secured by counter-adjustment (changing the internal voltage VINT) was added.

The n-channel field effect transistor 123 is do dimensioned that the p-channel field effect transistor 124 is—also—operated in the saturation current region.

The saturation current IDSAT(p) flowing through the p-channel field effect transistor is diverted via the n-channel field effect transistor 123 and the line 128 to ground potential (GND).

Because—as is described above, the width W of the n-channel field effect transistor 121 is one half of the width 2W of the p channel field effect transistor 124, the current—flowing in total through the n-channel field effect transistor 121 and the p-channel field effect transistor 124 (i.e. the lines 126 and 127)—therefore equates with the above saturation current nominal value IDSAT=IDSAT(n)+2×IDSAT(p).

As already described above, the above constant current source 125—via line 136 connected to the transistors 121, 122—causes a current flow at the level of nominal saturation current (IDSATnom) to take place.

Therefore the level voltage VREFSUM, present at the drain of the n-channel field effect transistor 121, lies either above or below the level of the internal voltage VINT minus the critical limit voltage VTH—depending on whether the total current IDSAT(actual) flowing through both the transistors 121, 124), lies below or above the critical value of the above current IDSAT.

In other words, by means of the comparison—performed by the comparator circuit 33—between the level of the voltage VREFSUM present on line 120 and the level of the voltage VINT_MINUS_VTH present on line 115, it can be determined whether the efficiency of the transistor connected to the internal voltage VINT is sufficiently high, or whether—by increasing the internal voltage VINT—it can be increased.

In this case—as already described above—the comparator circuit 33 emits a signal VREF2 via line 26 to the voltage increase detection circuit 36, which signal indicates a higher voltage level than that of the signal VREF1, emitted by the buffer circuit 13 onto line 19*a*.

The level of the voltage VINT emitted by the voltage regulator 14 is then—as already described above—correspondingly increased (and in fact—as also described already—for instance from VINT=VINTnom=VREF1 to VINT=VREF2 (and/or from VINT=VINTnom=VREF×(1+$(R_1/R_1)$) to VINT=VREF2×(1+$(R_2/R_1)$)).

What is claimed is:

1. A voltage regulation system, comprising:

a first voltage generating device with an output coupled to a reference voltage node that carries a reference voltage;

a second voltage generating device with an output coupled to the reference voltage node; and a voltage regulator coupled to the reference voltage node to generate an essentially constant internal voltage, wherein the second voltage generating device comprises:

a process monitor circuit, an output voltage of the process monitor circuit being generated in response to an essentially constant current fed to the process monitor circuit;

a comparator, a first input of the comparator connected to the output voltage of the process monitor circuit; and a second input of the comparator connected to a voltage representing a difference between the essentially constant internal voltage and a threshold voltage of a transistor.

2. The voltage regulation system according to claim 1, wherein the second voltage generating device raises the reference voltage when it is detected that an efficiency of any components connected to the essentially constant internal voltage falls below a critical limit.

3. The voltage regulation system according to claim 2, wherein the first voltage generating device generates the reference voltage from a $V_{DD}$ node, or from a voltage derived from the $V_{DD}$ node.

4. The voltage regulation system according to claim 3, wherein the second voltage generating device generates a voltage that is higher than the reference voltage generated by the first voltage generating device when it is detected that the efficiency of the components, if any, connected to the essentially constant internal voltage falls below the critical limit.

5. The voltage regulation system according to claim 3, wherein the reference voltage, or a voltage derived from the reference voltage, and the voltage generated by the second voltage generating device, or a voltage derived from the voltage generated by the second voltage generating device, are used to control the voltage regulator.

6. The voltage regulation system according to claim 2, wherein the second voltage generating device includes also an enable node for activating and/or deactivating the second voltage generating device.

7. The voltage regulation system according to claim 6, wherein, in an activated state of the second voltage generating device, the reference voltage has a level that is determined by the higher of a voltage generated by the first voltage generating device or a voltage generated by the second value generating device.

8. A voltage regulation process, comprising:

converting a first voltage into a second, essentially constant voltage, which carries a lower voltage level than the first voltage; and assessing the efficiency of any components connected to the second voltage by a process monitor circuit to which an essentially constant current is fed, the essentially constant current essentially corresponding to a nominal saturation current of a transistor.

9. The process according to claim 8, which further comprises raising the second voltage when it has been assessed that the efficiency of the components connected to the second voltage falls below a critical limit.

10. A method for voltage regulation, the method comprising:

receiving an input system voltage;

generating a first reference voltage from the input system voltage;

generating a second reference voltage; and generating an output system voltage from the first reference voltage and the second reference voltage;

wherein generating the second reference voltage comprises:

monitoring the output system voltage with respect to an essentially constant current;

determining a difference between the output system voltage and a threshold voltage of a transistor; and comparing a result of the monitoring with a result of the determining to generate the second reference voltage.

11. A voltage regulation system comprising:

a band-gap reference voltage generator having an input receiving a supply voltage;

a buffer circuit with an input coupled to an output of the band-gap reference voltage generator;

a voltage regulator with an input coupled to an output of the buffer circuit;

a process monitor circuit with a first input coupled to an output of the voltage regulator and a second input coupled to receive a reference current;

a threshold subtraction circuit with an input coupled to the output of voltage regulator; and a comparator with a first input coupled to an output of the process monitor circuit and a second input coupled to an output of the threshold subtraction circuit, the comparator further comprising an output coupled to the input of the voltage regulator.

12. The voltage regulation system of claim 11, wherein the voltage regulator comprises a down converter.

13. The voltage regulation system of claim 11, wherein the second input of the process monitor circuit is coupled to receive an essentially constant current as the reference current.

14. The voltage regulation system of claim 13, wherein the essentially constant current essentially corresponds to a nominal saturation of a transistor.

15. The voltage regulation system of claim 11, wherein the buffer circuit comprises:

a differential amplifier having a first input coupled to the input of the buffer circuit and a second input coupled to the output of the buffer circuit;

a transistor having a control terminal coupled to an output of the differential amplifier and a current path coupled between the supply voltage and the output of the buffer circuit.

16. The voltage regulation system of claim 15, wherein the first input of the differential amplifier comprises a negative input, the second input of the differential amplifier comprises a positive input, and the transistor comprises a p-channel field effect transistor.

17. The voltage regulation system of claim 11, wherein the voltage regulator comprises:

a differential amplifier having a first input coupled to the input of the voltage regulator and a second input; and a transistor having a gate coupled to an output of the differential amplifier, the transistor further including a current path between the supply voltage and the output of the voltage regulator.

18. The voltage regulation system of claim 11, wherein the threshold subtraction circuit comprises:

an electronic component coupled between the output of the voltage regulator and the output of the threshold subtraction circuit; and a resistor coupled between the output of the threshold subtraction circuit and a ground voltage.

19. The voltage regulation system of claim 11, wherein the process monitor circuit comprises:

a first transistor with a gate coupled to the output of the voltage regulator and a current path coupled between the second input of the process monitor circuit and a ground voltage;

a second transistor with a current path coupled between the second input of the process monitor circuit and the ground voltage; and a third transistor with a gate coupled to a gate of the second transistor, the third transistor having a current path coupled between the output of the voltage regulator and the ground voltage.

20. The voltage regulation system of claim 19, wherein the process monitor circuit further comprises a fourth transistor with a current path coupled between the output of the voltage regulator and the ground voltage such that the fourth transistor is coupled in series with the third transistor.

* * * * *

UNITED STATES PATENT AND TRADEMARK OFFICE

CERTIFICATE OF CORRECTION

PATENT NO. : 7,312,652 B2
APPLICATION NO. : 11/044995
DATED : December 25, 2007
INVENTOR(S) : Brox It is certified that error appears in the above-identified patent and that said Letters Patent is hereby corrected as shown below:

Col. 1, line 9, delete “FILED” and insert --FIELD--.
Col. 1, line 56, delete “time”.
Col. 1, line 66, delete “VGBR” and insert --VBGR--.
Col. 2, line 13, delete “transistors,” and insert --transistors--.
Col. 3, line 13, after “instance”, insert --via--.
Col. 3, line 67, delete “2” and insert --1--.
Col. 4, line 12, delete “(referenced” and insert --(reference)--.
Col. 5, line 15, delete “component” and insert --comparator--.
Col. 5, line 16, after “in the event that the,” insert --comparator circuit 33 has been activated – a saturation current (IDSAT) flowing through--.
Col. 5, line 36, delete “seen” and insert --been--.
Col. 6, line 3, delete “levels” and insert --level--.
Col. 6, line 13, delete “VIONTnom” and insert --VINTnom--.
Col. 7, line 47, delete “125A” and insert --125--.
Col. 8, line 8, delete “normal” and insert --nominal--.
Col. 8, line 43, delete “a” and insert --is--.
Col. 8, line 48, delete “was added.” and insert --where needed).--.
Col. 8, line 49, delete “do” and insert --so--.
Col. 8, line 57, delete “above,” and insert --above—--.
Col. 9, line 12, delete “transistor” and insert --transistors--.
Col. 9, line 26, delete “($R_1$/$R_1$))” and insert --($R_2$/$R_1$))--.
Col. 9, line 57, delete “node,” and insert --node--.
Col. 10, line 6, delete “includes also” and insert --also includes--.
Col. 10, line 14, delete “value” and insert --voltage--.
Col. 10, line 60, before voltage, insert --the--.

Signed and Sealed this

Twentieth Day of May, 2008

JON W. DUDAS
*Director of the United States Patent and Trademark Office*